June 4, 1963   J. D. PEMBLETON   3,092,128
BLEED VALVE CONTROL MECHANISM
Filed Feb. 27, 1956                                           4 Sheets-Sheet 1
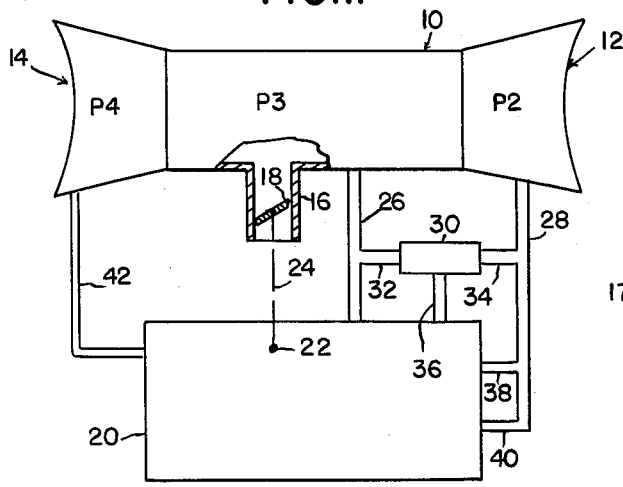
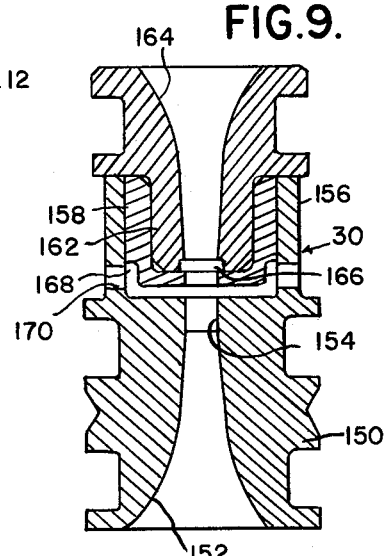
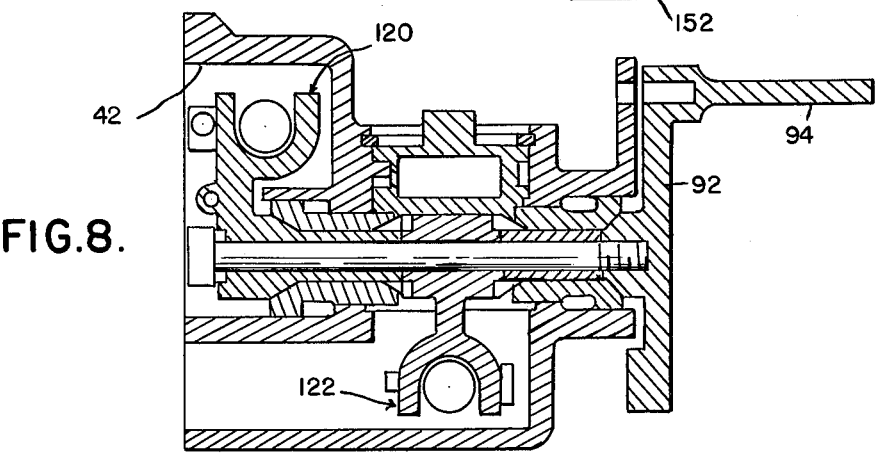
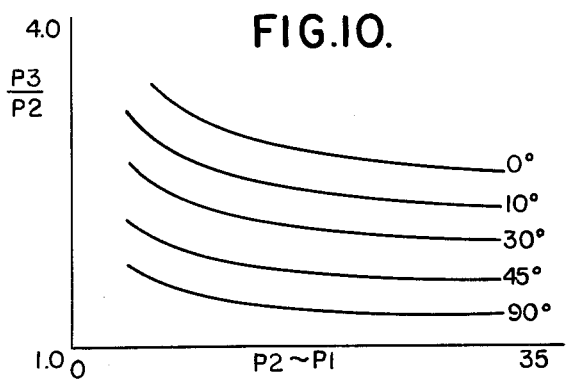
INVENTOR.
JAMES D. PEMBLETON
BY
Hulbert & Belknap
ATTORNEYS

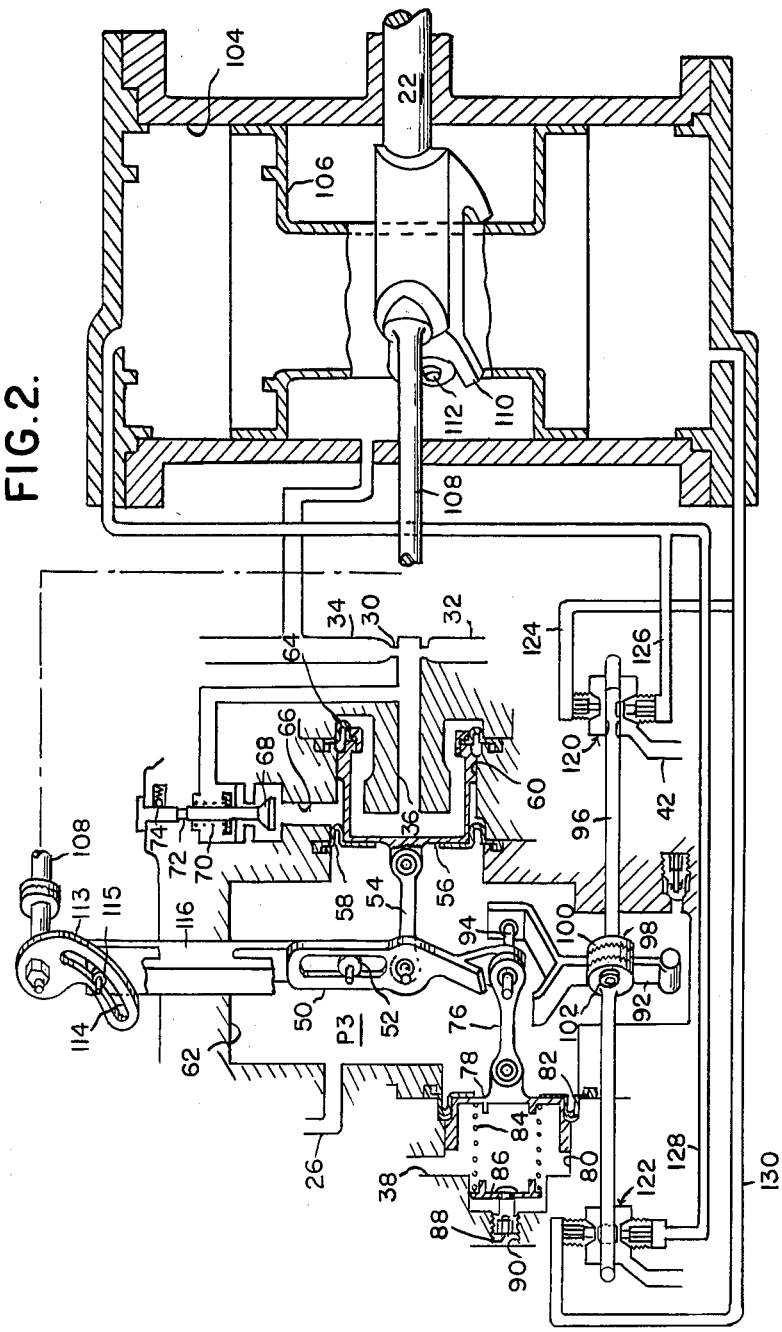

INVENTOR.
JAMES D. PEMBLETON

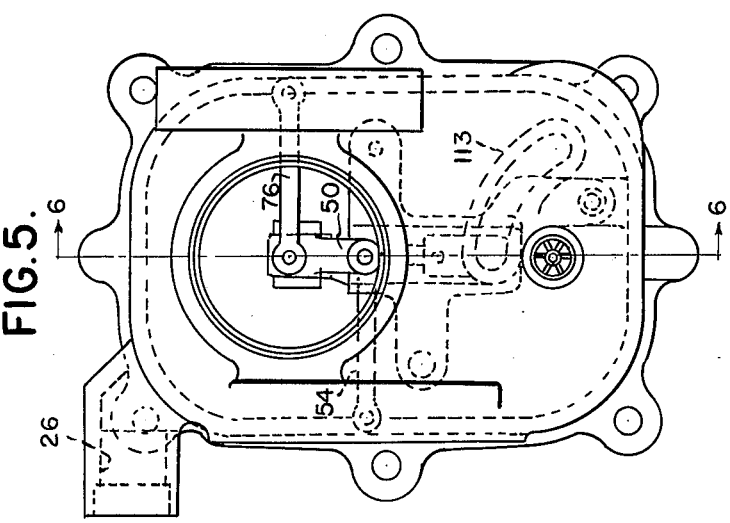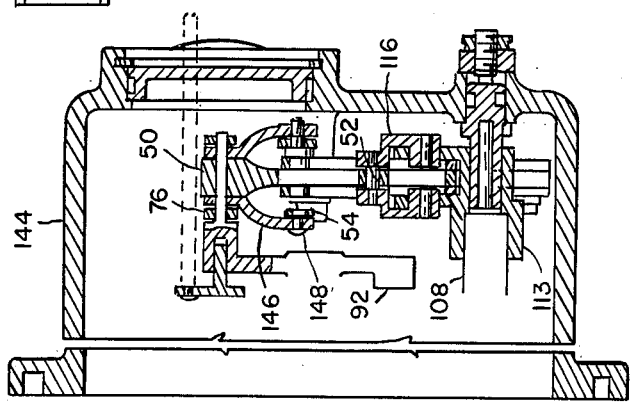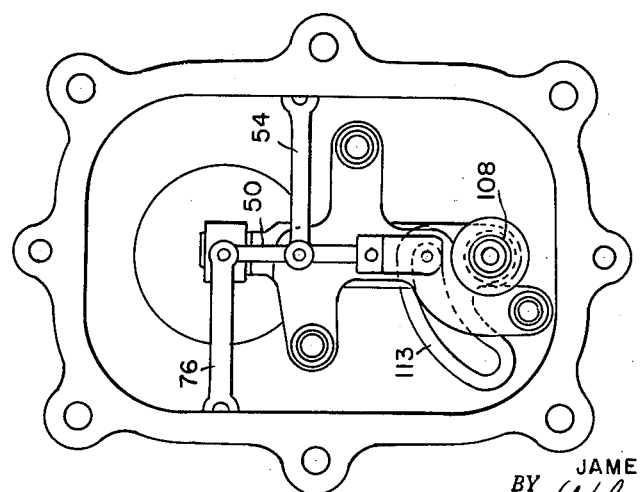

United States Patent Office 3,092,128
Patented June 4, 1963

3,092,128
BLEED VALVE CONTROL MECHANISM
James D. Pembleton, Oak Park, Mich., assignor to Holley Carburetor Company, Van Dyke, Mich., a corporation of Michigan
Filed Feb. 27, 1956, Ser. No. 568,013
13 Claims. (Cl. 137—81)

The present invention relates to bleed valve actuator control mechanism, and more particularly to the metering of bleed air flow from a gas turbine engine as a function of the ratio between compressor pressure and altitude as determined by inlet pressure to the compressor.

The metering parameters are the static pressure at the inlet to the compressor, hereinafter referred to as P2, and some intermediate compressor pressure P3. The control mechanism employs as the source of actuating pressure a further internal compressor pressure designated P4. All pressures are pneumatic.

It is an object of the present invention to provide mechanism for controlling the ratio $$\frac{P3}{P2}$$

by mechanism employing the characteristics of a choked venturi.

It is a further object of the present invention to provide mechanism for controlling a bleed valve leading to the interior of the compressor in accordance with variations in the internal pressure and altitude as determined by the static pressure at the inlet to the compressor.

It is a further object of the present invention to employ a choked venturi to obtain a variable pressure equal to a predetermined fraction of the internal pressure existing within a compressor.

Other objects and features of the invention will become apparent as the description proceeds, especially when taken in conjunction with the accompanying drawings, wherein:

FIGURE 1 is a diagrammatic view showing the connections between the gas turbine compressor and the control unit.

FIGURE 2 is a diagrammatic view showing the control mechanism.

FIGURE 5 is an enlarged end view of the computer section of the control mechanism, with parts removed.

FIGURE 6 is a section on the line 6—6, FIGURE 5, with parts removed.

FIGURE 7 is an end view looking into the casing, with parts removed.

FIGURE 8 is an enlarged elevational view of the valve mechanism.

FIGURE 9 is an enlarged sectional view of the choked venturi employed in the mechanism.

FIGURE 10 is a graph showing the curves developed by the operation of the control mechanism.

Figure 4:
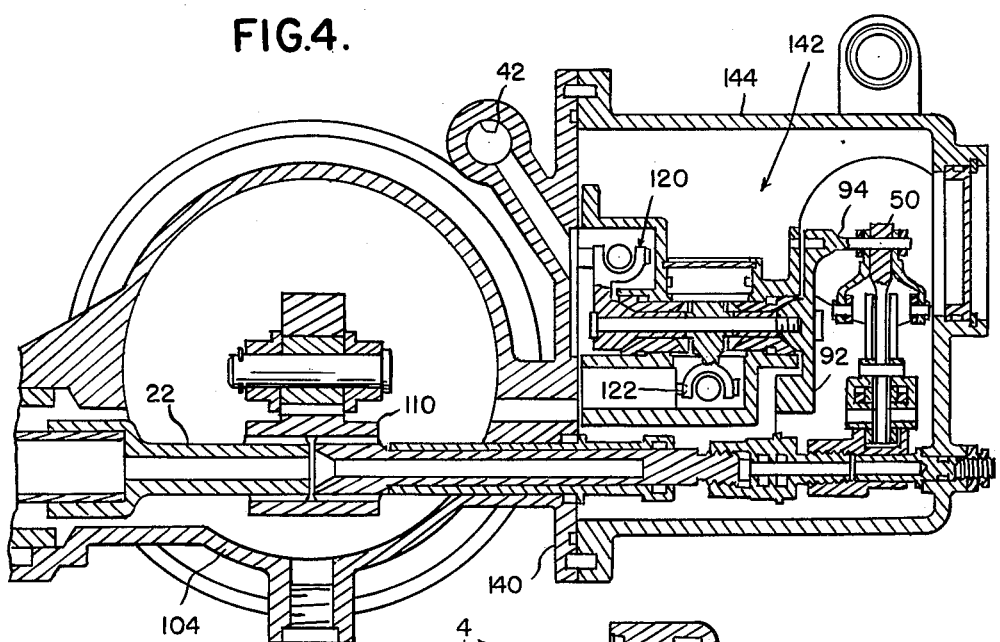
FIGURE 4 is a sectional view on the line 4—4, FIGURE 3.

Referring first to FIGURE 10, the graph illustrates a family of curves having the general formula $$\frac{P3}{P2} = \left[\frac{K1}{P2} + 1\right] K2$$

It will be observed that this graph shows values of ratio $$\frac{P3}{P2}$$

for different angular openings of the bleed valve as a function of altitude as determined by P2 (static inlet pressure to the engine), or P1 (atmospheric pressure). In this equation the value of K1 is contributed to by an adjustable spring in the control mechanism as will later appear, and K2 determines the angular position of the butterfly valve controlling bleed from the engine.

In order to accomplish this equation with a mechanism and not resort to an evacuated bellows for the altitude contribution, the characteristics of a choked venturi are used in which the throat pressure of the venturi (referred to as Py), is equal to an interior pressure P3 within the compressor multiplied by a constant as for example .53. Because the characteristics of an ordinary venturi will not cover the operating range, a venturi as will subsequently be described in detail has been developed.

Referring now to FIGURE 1, a gas turbine compressor is indicated generally at 10 having an inlet end 12 and an outlet end 14. Static pressure at the inlet end 12 of the compressor is designated P2. At a predetermined intermediate location within the compressor an elevated interior pressure equal to P3 exists. At the exhaust end of the compressor 10 there exists the exhaust pressure P4, which is substantially above atmospheric pressure. In this figure a bleed passage 16 is diagrammatically indicated having a bleed valve 18 therein. Obviously, the angular position of the bleed valve 18 controls the bleed of air from the interior of the compressor and hence, directly influences the pressure P3, which in turn determines the instantaneous value of ratio $$\frac{P3}{P2}$$

The control mechanism for determining the angular position of the bleed valve 18 is indicated generally at 20 and includes a shaft 22 connected by suitable mechanism diagrammatically indicated at 24 in FIGURE 1 to the bleed valve 18.

The mechanism contained within the control device 20 is described in detail in subsequent FIGURES but it will be observed that the pressure P3 is communicated to the interior of the control device through the passage 26. As passage 28 connects to the interior of the inlet end of the compressor. The choked venturi 30 is connected between passages 26 and 28 by branches 32 and 34 and the pressure existing within the throat of the venturi is communicated to the interior of the control device by a passage 36. The passage 28 has branches 38 and 40 extending to the interior of the control device. Finally, a passage 42 extends from the outlet end of the compressor to the interior of the control device to provide a source of fluid under pressure for actuation of a fluid motor which contains a part of the control device.

Referring now to FIGURE 2, there is diagrammatically illustrated the mechanism located within the control device, that portion of the mechanism in the upper left hand portion of the figure constituting the computer section. The motor is comprised by the piston and cylinder device shown at the right of the figure. The valve means for controlling the motor and actuated by the computer section is located at the lower left hand side of the figure.

As diagrammatically represented in FIGURE 2, the computer section of the control device comprises a walking beam 50 mounted for rocking movement about a pivot support 52 which is adjustable by mechanism later to be described. Connected to the walking beam 50 is a first link 54 one end of which is connected to a piston 56 connected by an annular flexible diaphragm 58 within a cylinder 50. The side of the piston and flexible diaphragm adjacent the walking beam 50 is exposed to a pressure P3 which is led into the interior of the chamber 62 through the passage 26. The opposite side of the piston and flexible diaphragm 56, 58 is exposed to a pressure Py which is a predetermined fraction of the interior pressure P3 of the compressor by the passage 36 which extends from the throat of the venturi 30, the venturi being connected between the passages 26 and 28 by the short passages 32 and 34.

In order to permit continued operation of the control device in the event of failure of the diaphragm 58, a second flexible diaphragm 64 is provided. Intermediate the diaphragms 58 and 64 is an exhaust passage 66 controlled by a normally open check valve 68 held in normally open position during operation by a light compression spring 70. The valve stem includes an annular groove 72 cooperable with a spring pressed detent 74 which operates to hold the valve 68 in closed position on shut down. In the event that the diaphragm 58 ruptures, the relatively high pressure existing within the chamber 62 reaches the check valve 68 through the passage 66 and closes the valve. When this happens the piston 56 continues to operate as before, the flexible diaphragm 64 serving to seal the high pressure P3 existing at one side of the piston from the low pressure as determined by the venturi 30 which exists at the opposite side of the piston.

The construction illustrated in FIGURE 1 thus operates to cause the link 54 to exert a counterclockwise torque to the walking beam 50.

A second link 76 is connected to the walking beam 50 at a point spaced substantially further from the pivot 52 than is the connection of the first link 54. The second link 76 is connected to a piston 78 movable within a cylinder 80, the piston being sealed by means of the flexible annular diaphragm 82. The right hand side of the piston 78 as seen in FIGURE 2, is exposed to the elevated pressure P3 within the chamber 62. The left hand side of the piston 78 is exposed to pressure existing within the cylinder 80 which is static inlet pressure P2 led to the interior of the cylinder 80 by the branch passage 38. It will be appreciated that the actual arrangement and connection of passages may be substantially different from the simplified version illustrated in FIGURE 1 where single connections are shown to the compressor and multiple connections to the control device are provided by branch passages.

Within the chamber formed by cylinder 80 is a compression spring 84 one end of which bears against the piston 78 and the other end of which bears against an adjustable spring seat 86 carried by a threaded adjusting stud 88 threaded within a tapped opening 90 leading to the interior of the cylinder 80. The spring 84 is preferably a substantially constant rate spring and its effectiveness is adjusted by the adjusting mechanism including the threaded stud 88 to adjust operation of the control device.

It will be apparent that the pressure within the chamber 62 exceeds the pressure within the cylinder 80 so that the pressure effect on the piston and diaphragm 78, 82 is to establish a force tending to rotate the walking beam 50 clockwise. However, the spring 84 provides a force opposing the resultant pressure differential. Assuming a static condition of the walking beam, it will be stationary as a result of the balanced torques applied by the links 54 and 76, and the value of these torques will of course be dependent upon the torque arm which in turn is dependent upon the instantaneous spacing of the points of connection of the links and walking beam from the pivot support 52.

Rocking movement of the walking beam 50 is transmitted to a valve control arm 92. In the diagrammatic showing of FIGURE 2 the connection between the walking beam 50 and the arm 92 is illustrated as provided by a pin 94 which also provides the pivot connection between the link 76 and the walking beam 50. The arm 92 is connected to a pivot shaft 96 by adjustable mechanism indicated generally at 98 providing for angular adjustment between the arm 92 and the shaft 96. Conveniently, this adjustment may be provided by finely serrated surfaces 100 which may be disengaged by the release of an assembly screw 102 and re-engaged in adjusted position. The shaft 96 is supported for angular movement and against transverse movement, and hence limits the path of movement of the pin 94 to an arc whose center is coincident with the axis of the shaft 96.

Motor mechanism is included within the control device and comprises a cylinder 104 having a piston 106 movable therein. Fluid under pressure is admitted to one end or the other of the cylinder to move the piston therein and this fluid is controlled by valve means which will subsequently be described. Adjacent the cylinder 104 is a shaft 108 which has a yoke 110 fixedly secured thereto engageable with pins 112 on the piston. Accordingly, vertical movement of the piston as seen in FIGURE 2, results in rocking of the shaft 108. As seen at the left hand part of the figure, the shaft 108 has fixedly secured thereto a cam 113 having an arcuate slot 114 therein. Located in the arcuate slot 114 is a cam follower or roller 115 carried by the upper end of a vertically movable support member 116 which at its lower end carries the pivot support 52. Accordingly, movement of the piston 106 results in movement of the pivot support 52 on which the walking beam 50 is pivoted. The mechanism is arranged so that the result is a follow up action and upon movement of the walking beam as a result of a change in pressures on the pistons and flexible diaphragms, the piston will move to a new position and will reposition the pivot support 52 to re-establish equilibrium.

Movement of the piston 106 in addition effects rotation of the shaft 22 previously described, which in turn effects an adjustment of the bleed valve 18.

Angular movement of the shaft 96 which results from rocking movement of the walking beam 50 controls admission of fluid under pressure and exhaust of fluid from the cylinder 104. This is accomplished by servo mechanism including double acting poppet servos 120 and 122. The valve structure at 120 controls flow of actuating pressure through the line 42 and depending upon the rotational position of the shaft 96 will admit more or less pressure to the passage 124 which communicates with the lower end of the piston or the passage 126 which communicates with the upper end of the piston. At the same time the valve structure at 122 through the passage 128 may connect the upper end of the cylinder 104 to exhaust or through the passage 130 may connect the lower end of the cylinder to exhaust. The servos thus meter the actuating air to and from both sides of the piston 106 under the control of the computing mechanism which brings about rocking movement of the walking beam 50. As previously suggested, the resulting movement of the piston effects vertical adjustment of the pivot support 52 to terminate movement of the piston, to restore the servo mechanism to equilibrium and to reposition the piston, the pivot support 52, and the bleed valve 18.

Briefly reviewing the operation of the mechanism diagrammatically illustrated in FIGURE 2, the following will be apparent. Internal pressure of the compressor P3 enters the computer section of the control device through the passage 26. This pressure is applied to piston and diaphragm 56, 58 and piston and diaphragm 78, 82. The pressure on the reverse side of the piston 56 is determined by the throat pressure of the venturi 30, the venturi being connected between sources of pressure P3 and P2 by passages 32 and 34.

The pressure on the reverse side of the piston 78 is pressure P2 and its effectiveness is determined by the spring 84 and its adjustment as effected by adjustment means 88, 90. The spring and its adjustment contribute to the value K1 of the equation previously set forth.

The valve 68 is installed across the flexible diaphragm 64 such that if the diaphragm 58 ruptures, the valve 68 will close, thus establishing the differential across the diaphragm 64.

The differential on the piston 56 and diaphragm 58 is applied to the walking beam 50 through the link 54 and the differential of the piston 78 and diaphragm 82 plus the load of the spring 84 is applied to the walking beam through the link 76. Assuming a static condition a change in any of the forces applied to the beam 50 causes the beam to rotate about the pivot support 52, thus indicating an error. This rotational error is transferred to the double acting poppet servos 120 and 122 through the arm 92. This action controls the pressures at opposite sides of the piston 106 and the servos meter the air to and from both sides of the piston.

Travel of the piston 106 rotates the shaft 22 through the yoke 110. The shaft 22 is attached to the bleed valve 18 on the compressor. The shaft 108 is also rotated by movement of the piston through the yoke 110 and this rotation is fed back to the beam pivot support 52 through the cam 113. This action closes the loop creating a force balance system by changing the beam pivot support 52 as a function of the bleed valve angle.

The equation of this mechanism is $$\frac{P3}{P2}\left[\frac{KsX/A4}{P2}+1\right]\cdot\frac{1}{1-\frac{L2}{L1+L2}\cdot\frac{A4(-Kv)}{A6}}$$

where
P3 is internal pressure within the compressor in pounds per square inch;
P2 is static inlet pressure of the compressor in pounds per square inch;
$Ks$ is spring rate of the spring 84;
X is initial compression of the spring 84 in inches;
A4 is effective area of the piston 56 and diaphragm 58 in square inches;
A6 is effective area of the piston 78 and diaphragm 82 in square inches;
$Kv$ is venturi constant of the venturi 30;
L2 is the distance in inches between pivot support 52 and link 54 (this distance varies as a function of the bleed valve angle); and
L1 is the distance in inches between the link 54 and the link 76 (this distance is fixed).

Figure 3:
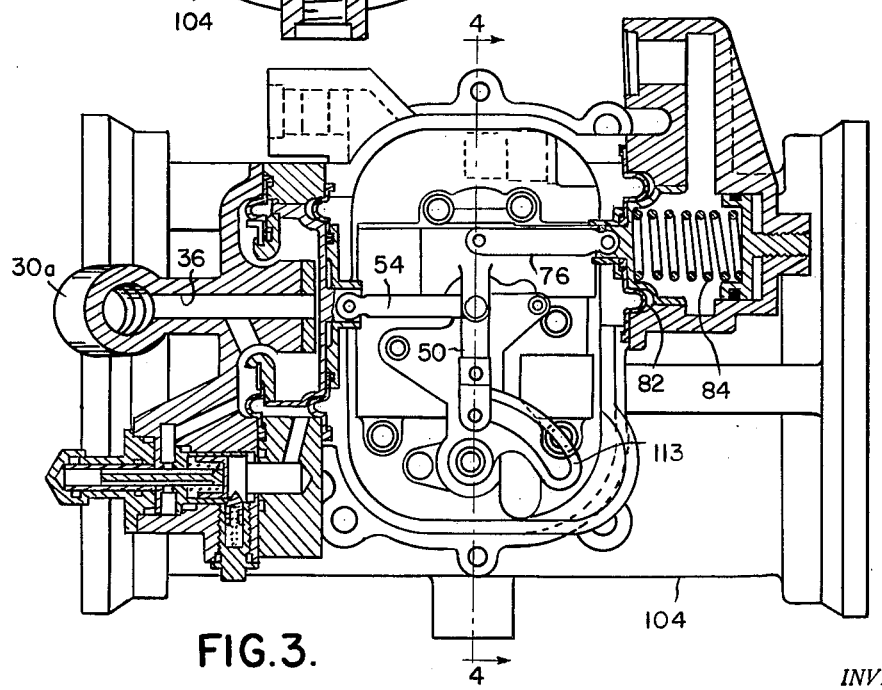
FIGURE 3 is a side elevational view of the control mechanism with parts broken away.

Referring now to FIGURES 3 and 4 there is illustrated a completely designed control device embodying the features illustrated diagrammatically in FIGURE 2. In these figures corresponding parts are given the same numerals applied to the diagrammatic illustration of FIGURE 2. Particular attention is invited however to the separation of the control device into the power cylinder 104 provided in a casting having an assembly flange 140, and the combined computing and valve control section indicated generally at 142 and housed within a casting 144 bolted or otherwise detachably secured to the cylinder casting. In FIGURE 3 there is shown at 30a an extension in which the venturi 30 is located, the passage 36 leading to the throat of the venturi being illustrated. FIGURE 4 also clearly illustrates the mechanical connection between the pivoted walking beam 50 and the lever 92 which oscillates the shaft 96 to effect the servos 120 and 122.

Referring now to FIGURES 5, 6 and 7 there is an enlarged showing of the structural details of the computing mechanism. The parts are given the same reference numerals as applied thereto in the diagrammatic showing of FIGURE 2 so far as applicable.

It will be observed in FIGURE 6 that the end of the link 54 connected to the beam 50 is bifurcated and the connection is provided between a yoke construction 146 by pins 148. It will be appreciated that the interior of the casting 144 is subjected through the passage 26 to the pressure P3 existing at an intermediate point in the compressor.

Referring now to FIGURE 8, the servo mechanism is illustrated on an enlarged scale, the parts being identified by the reference numerals applied to the diagrammatic view.

Referring now to FIGURE 9, there is illustrated the venturi construction 30 which is inserted in the tubular portion of the projection 30a. The venturi comprises an inlet portion 150 having a passage 152 extending to the restricted throat 154. The inlet portion 150 includes a tubular extension 156 in which a cup-shaped member 158 is received. The outlet portion of the venturi has a reduced cylindrical part 162 extending within the hollow interior of the cup 158 and formed with a passage 164 therein which flares outwardly toward the outlet end from the throat portion thereof. The venturi is provided with a shock groove 166 which is formed by an annular enlargement of the passage 164 in the outlet member at the end adjacent the bottom of the cup 158. The throat of the venturi communicates with an annular space 168 which in turn communicates with a plurality of radial passages 170. It will be understood that the venturi assembly illustrated in FIGURE 9 is received within the portion 30a so that pressure existing at the throat of the venturi, which has been designated Py, communicates through the passage 36 to the outer side of the piston and diaphragm 56, 58.

The venturi as is well understood, is designed to operate in a choked condition and the purpose of the shock groove 166 is to shock the flow pattern at the same point in the venturi so that the loss does not change as a function of $$\frac{P3}{P2}$$

The design of the venturi is such that the nozzle will operate choked throughout a range of variation in pressure ratio $$\frac{P3}{P2}$$

from 1.3 and higher.

Referring again to FIGURE 2, a typical sequence of operation of the elements of the bleed control will be described. Assume the compressor operating under constant conditions with the beam 50 in an intermediate position and hence holding the servos 120 and 122 in a balanced condition with the result that the piston 106 of the motor is stationary in an intermediate position. At this time of course the counterclockwise torque applied by the piston and diaphragm 56, 58 in a clockwise direction is balanced by the torque applied through the piston and diaphragm 78, 82 as determined by the pressure differential between P3 and P2 and the effectiveness of the spring 84. Assume now an increase in the value of the pressure P2. While the venturi has its outlet side connected to the pressure P2, this pressure does not enter into the value of the pressure applied through the passage 36 to the outer side of the piston and diaphragm 56, 58, since the venturi 30 is operating in a choked condition. Accordingly, the torque exerted through the link 54 is unchanged. However, the increase in the value of the pressure P2 applies a counterclockwise torque to the beam 50 with resultant rotation thereof and corresponding rotation of the lever 92 to effect a setting of the servo mechanisms to apply fluid under pressure to the underside of the piston 104. This immediately causes the piston to start to move upwardly and effect a closing movement of the bleed valve 18. At the same time, rotation is imparted to the cam 113 rotating it clockwise as seen in FIGURE 2, and effecting an upward movement of the pivot 52. Upward movement of the pivot 52 increases the torque arms of the links 54 and 76 but percentage-wise, it increases the lever arm of the link 54 to a greater extent; this, plus the fact that the effective areas of pistons 56 and 78 are different (56 being the larger as illustrated in the preferred embodiment) results in piston and diaphragm 56, 58 obtaining a continually greater degree of control. At the same time, the closing movement of the bleed valve 18 has produced an increase in the pressure P3. This pressure acts against the pressure P2 on the piston and diaphragm 78, 82 tending to restore the beam 50 to neutral position. The return of the beam to neutral position is of course opposed by the differential pressure applied through the piston and diaphragm 56, 58, but the differential of the pressure P3 and the pressure Py as determined at the throat of the choked venturi is for example, only 47% of the pressure P3. Accordingly, the beam is restored to neutral position with the bleed valve 18 in the adjusted position required to maintain the pressure P3 in the required relationship to the static ambient atmospheric pressure P2.

Attention is particularly directed to the fact that the operation of the apparatus is such as to effect a gradual modulating control movement of the bleed valve which is thus capable of being set in any intermediate adjusted position necessary to maintain the required relationship between the pressures P2 and P3.

The drawings and the foregoing specification constitute a description of the improved bleed valve actuator control mechanism in such full, clear, concise and exact terms as to enable any person skilled in the art to practice the invention, the scope of which is indicated by the appended claims.

What I claim as my invention is:

1. Servo mechanism for controlling the opening of a bleed valve comprising a servo motor, means for controlling the position of said motor comprising a movable member subjected to a force which is a function of the pressure differential between static ambient atmospheric pressure and a second pressure controlled by the bleed valve, and which member is subjected to a second force which is a function of the pressure differential between the second pressure, and a third pressure which is a constant fraction of the said second pressure, and means responsive to movement of the motor operable to vary the effectiveness of the forces developed by the aforesaid differential pressures independently of the values of said pressures.

2. Mechanism as defined in claim 1 in which said movable member is mounted for movement about a pivot member and in which the forces developed by the aforesaid differential pressures apply opposed torques to said member, and in which the means responsive to movement of the motor is effective to effect a differential change in the torque arms of the forces developed by the aforesaid differential pressures.

3. Servo mechanism for adjusting the position of a bleed valve, said mechanism comprising a reversible motor adapted to be connected to the bleed valve, a motor control member movable in either direction from a neutral position, means responsive to movement of said member from neutral position to initiate motor operation in a direction determined by the direction of movement of said member and to stop motor operation on return of said member to neutral position, a first bias device connected to said member to apply a bias force thereto dependent on a first pressure whose value is dependent on the position of the bleed valve, a second bias device connected to said member to apply a second bias force thereto in opposition to the bias force applied by said first bias device and which second bias force is dependent on the difference between said first pressure and static ambient atmospheric pressure, and means responsive to operation of said motor to variably modify the effectiveness of said bias forces.

4. Mechanism as defined in claim 3 in which said member is a pivoted beam, and in which said bias devices are connected to said beam at different distances from the pivot axis of said beam.

5. Mechanism as defined in claim 4 in which the means to modify the effectiveness of said bias forces comprises means for shifting the pivot axis of said beam longitudinally of said beam to change the effective lever arms of said bias forces.

6. In a bleed valve control system, a motor adapted to be connected to a bleed valve, a beam movable in either direction from a neutral position, motor control means operable by said beam, pivot means mounting said beam for rocking motion, means actuated by said motor for adjusting said pivot means longitudinally of said beam, first bias means connected to said beam at a fixed point for applying a torque thereto dependent on the location of said pivot means and the value of a first pressure dependent on the position of the bleed valve, a second bias means connected to said beam at a fixed point for applying an opposite torque thereto dependent on the location of said pivot means and the differential between the first pressure and static ambient atmospheric pressure, and adjustable spring means operably connected to said beam to oppose bias forces applied by said second bias means.

7. Servo mechanism for adjusting the position of a bleed valve, said mechanism comprising an enclosed pressure chamber means adapted to connect the interior of said chamber to a first pressure controlled by said valve, first flexible diaphragm means having one side exposed to pressure in said chamber, means subjecting the other side thereof to a substantially constant fraction of such pressure, second flexible diaphragm means having one side exposed to pressure in said chamber, means subjecting the other side thereof to static ambient atmospheric pressure, adjustable spring means connected to said second diaphragm means and opposing forces applied thereto by pressure within said chamber, a pivoted beam, links connecting said diaphragm means to said beam, motor control means actuated by said beam, and beam rebalancing means operated by said motor.

8. Servo mechanism as defined in claim 7 in which said beam rebalancing means comprises means to adjust the pivot axis of said beam longitudinally thereof.

9. Servo mechanism for controlling the opening of a valve, comprising a servo motor, means for controlling the position of said motor comprising a movable member subjected to a force which is a function of the pressure differential between static ambient atmospheric pressure and a second pressure controlled by the valve, and which member is subjected to a second force which is a function of said second pressure, and means responsive to movement of said motor to vary the relative effectiveness of the forces developed by said aforesaid pressures independently of the values of said pressures.

10. Servo mechanism for controlling the opening of a valve, comprising a servo motor, means for controlling the position of said motor comprising a movable member subjected to a force in one direction which is a function of the pressure differential between static ambient atmospheric pressure and a second pressure controlled by the valve, said movable member being subjected to a second force in the opposite direction which is a function of said second pressure and having a null position in which said motor is at rest and operable to actuate said motor in opposite directions while displaced from said null position in opposite directions, and means responsive to movement of said motor to vary the relative effectiveness of the forces developed by said aforesaid pressures independently of the values of said pressures.

11. Servo mechanism for controlling the opening of a valve comprising a lever, pivot mounting means supporting said lever for swinging movement, first movable pressure responsive means effective to develop a first force which is a function of the pressure differential between static ambient atmospheric pressure and a second pressure controlled by the valve, a first connecting means establishing a first operative connection between said first pressure responsive means and said lever at a point separated from said pivot mounting means to apply a first moment to said lever in a first direction, second movable pressure responsive means effective to develop a second force which is a function of said second pressure, a second connecting means establishing a second operative connection between said second pressure responsive means and said lever at a point separated both from said pivot mounting means and the point of connection between said lever and said first connecting means to apply a second moment to said lever in the opposite direction from said first moment, and means responsive to movement of said lever effective to relatively change the length of the moment arms defined by the instantaneous distances between the pivot mounting means and the instantaneous points of connection of said first and second connecting means.

12. Servo mechanism defined in claim 11 wherein the points of connection of said first and second connecting means are located in the same direction from said pivot mounting means.

13. Servo mechanism for controlling the opening of a valve comprising a lever, pivot mounting means supporting said lever for swinging movement, first movable pressure responsive means effective to develop a first force which is a function of the pressure differential between static ambient atmospheric pressure and a second pressure controlled by the valve, a first connecting means establishing a first operative connection between said first pressure responsive means and said lever at a point separated from said pivot mounting means to apply a first moment to said lever in a first direction, second movable pressure responsive means effective to develop a second force which is a function of said second pressure, a second connecting means establishing a second operative connection between said second pressure responsive means and said lever at a point separated both from said pivot mounting means and the point of connection between said lever and said first connecting means to apply a second moment to said lever in the opposite direction from said first moment, and means responsive to movement of said lever effective to shift the pivot mounting means of said lever longitudinally thereof and thus to relatively change the length of the moment arms defined by the instantaneous distances between the pivot mounting means and the instantaneous points of connection of said first and second connecting means.

References Cited in the file of this patent

UNITED STATES PATENTS

| | | |
|---|---|---|
| 1,222,352 | Banner | Apr. 10, 1917 |
| 1,241,372 | Guyer | Sept. 25, 1917 |
| 1,713,833 | Kochendorfer | May 21, 1929 |
| 2,000,721 | Standerwick | May 7, 1935 |
| 2,182,873 | King | Dec. 12, 1939 |
| 2,209,032 | Mott | July 23, 1940 |
| 2,341,974 | Browne | Feb. 15, 1944 |
| 2,398,619 | Clark et al. | Apr. 16, 1946 |
| 2,409,836 | Coe | Oct. 22, 1946 |
| 2,456,066 | Kempton | Dec. 14, 1948 |
| 2,704,555 | Dall | Mar. 22, 1955 |
| 2,706,466 | Rosenberger | Apr. 19, 1955 |
| 2,732,125 | Ruby | Jan. 24, 1956 |
| 2,768,613 | Mercier | Oct. 30, 1956 |
| 2,800,136 | Bowditch | July 23, 1957 |
| 2,820,435 | Coar | Jan. 21, 1958 |
| 2,829,673 | Reese | Apr. 8, 1958 |
| 2,851,048 | Hutchinson | Sept. 9, 1958 |
| 2,863,601 | Torell | Dec. 9, 1958 |
| 2,930,520 | Abild | Mar. 29, 1960 |

FOREIGN PATENTS

| | | |
|---|---|---|
| 546,495 | Germany | Mar. 14, 1932 |